US005166701A

United States Patent [19]

Yamada

[11] Patent Number: 5,166,701

[45] Date of Patent: Nov. 24, 1992

[54] RECORDING DENSITY CORRECTION APPARATUS IN PRINTER

[75] Inventor: Hiromi Yamada, Kanagawa, Japan

[73] Assignee: Mitsubishi Denki K.K., Tokyo, Japan

[21] Appl. No.: 531,431

[22] Filed: May 31, 1990

[30] Foreign Application Priority Data

Jun. 8, 1989 [JP] Japan .................................. 1-144087

[51] Int. Cl.[5] ........................ G01D 15/10; H04N 1/23; B41J 2/36

[52] U.S. Cl. ................................ 346/76 PH; 358/298; 400/120

[58] Field of Search ........................... 346/76 PH, 1.1; 358/298; 400/120

[56] References Cited

U.S. PATENT DOCUMENTS 4,779,102 10/1988 Sasaki ..... ...................... 346/76 PH
4,801,948 1/1989 Kato ............................. 346/76 PH
5,038,208 8/1991 Ichikawa et al. .................... 346/1.1

FOREIGN PATENT DOCUMENTS 3718775 12/1987 Fed. Rep. of Germany .
0263773 11/1986 Japan .................................. 400/120
62-271763 11/1987 Japan .

*Primary Examiner*—Benjamin R. Fuller
*Assistant Examiner*—Huan Tran
*Attorney, Agent, or Firm*—Sughrue, Mion, Zinn, Macpeak & Seas

[57] ABSTRACT

A recording density correction apparatus in a printer, comprises; a correction gradation level data selection device for producing class numbers for selecting correction gradation level data for respective heating elements constituting a thermal head on the basis of information concerning unevenness in recording density; an odd/even line discriminator for discriminating as to whether a recording line is an odd or even line and for providing the thus obtained line information; and a correction device for providing the correction gradation level data on the basis of the class numbers and the line information so as to correct drive signals for the thermal head.

4 Claims, 4 Drawing Sheets

FIG. 2

| INPUT GRADATION LEVEL (DRIVE SIGNAL BEFORE CORRECTION) | CLASS NUMBER | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|
| | EVEN LINE | | | | | | | | | | | | | | | | | | ODD LINE | | | | | | | | | | | | | | | | | |
| | EVEN DOT | | | | | | | | | ODD DOT | | | | | | | | | EVEN DOT | | | | | | | | | ODD DOT | | | | | | | | |
| | 1 | ~ | 14 | 15 | 16 | 17 | 18 | ~ | 32 | 1 | ~ | 14 | 15 | 16 | 17 | 18 | ~ | 32 | 1 | ~ | 14 | 15 | 16 | 17 | 18 | ~ | 32 | 1 | ~ | 14 | 15 | 16 | 17 | 18 | ~ | 32 |
| 1 | 1 | | 1 | 1 | 1 | 1 | 1 | | 1 | 1 | | 1 | 1 | 1 | 1 | 1 | | 1 | 1 | | 1 | 1 | 1 | 1 | 1 | | 1 | 1 | | 1 | 1 | 1 | 1 | 1 | | 1 |
| 2 | 2 | | 2 | 2 | 2 | 2 | 2 | | 2 | 2 | | 2 | 2 | 2 | 2 | 2 | | 2 | 2 | | 2 | 2 | 2 | 2 | 2 | | 2 | 2 | | 2 | 2 | 2 | 2 | 2 | | 2 |
| 3 | 4 | | 3 | 3 | 3 | 3 | 3 | | 3 | 4 | | 3 | 3 | 3 | 3 | 3 | | 3 | 4 | | 3 | 3 | 3 | 3 | 3 | | 3 | 4 | | 3 | 3 | 3 | 3 | 3 | | 3 |
| 4 | 6 | | 4 | 4 | 4 | 3 | 3 | | 3 | 6 | | 4 | 4 | 4 | 4 | 3 | | 3 | 6 | | 4 | 4 | 4 | 4 | 3 | | 3 | 6 | | 4 | 4 | 4 | 3 | 3 | | 3 |
| 5 | 8 | | 5 | 5 | 5 | 4 | 4 | | 4 | 8 | | 5 | 5 | 5 | 5 | 4 | | 4 | 8 | | 5 | 5 | 5 | 5 | 4 | | 4 | 8 | | 5 | 5 | 5 | 4 | 4 | | 4 |
| 6 | 10 | | 7 | 6 | 6 | 5 | 5 | | 4 | 9 | | 7 | 7 | 6 | 6 | 5 | | 4 | 9 | | 7 | 7 | 6 | 6 | 5 | | 4 | 10 | | 7 | 6 | 6 | 5 | 5 | | 4 |
| ~ | | | | | | | | | | | | | | | | | | | | | | | | | | | | | | | | | | | | |
| 62 | 64 | | 63 | 62 | 62 | 62 | 62 | | 40 | 64 | | 63 | 63 | 62 | 62 | 62 | | 40 | 64 | | 63 | 63 | 62 | 62 | 62 | | 40 | 64 | | 63 | 62 | 62 | 62 | 62 | | 40 |
| 63 | 64 | | 64 | 63 | 63 | 63 | 63 | | 41 | 64 | | 64 | 64 | 63 | 63 | 63 | | 41 | 64 | | 64 | 64 | 63 | 63 | 63 | | 41 | 64 | | 64 | 63 | 63 | 63 | 63 | | 41 |
| 64 | 64 | | 64 | 64 | 64 | 64 | 64 | | 42 | 64 | | 64 | 64 | 64 | 64 | 64 | | 42 | 64 | | 64 | 64 | 64 | 64 | 64 | | 42 | 64 | | 64 | 64 | 64 | 64 | 64 | | 42 |

| HEATING ELEMENT NUMBER | 1 | 2 | 3 | 4 | 5 | 6 | 7 | 8 | 9 | 10 | 11 ··· |
|---|---|---|---|---|---|---|---|---|---|---|---|
| CLASS NUMBER | 18 | 17 | 17 | 17 | 17 | 16 | 15 | 14 | 15 | 15 | 15 ··· |

| | | CLASS NUMBER | | | | |
|---|---|---|---|---|---|---|
| | | 1 | 2 | ~ | 15 | 16 |
| INPUT GRADATION LEVEL | 1 | 2 | 2 | | 1 | 1 |
| | 2 | 4 | 4 | | 1 | 1 |
| | 3 | 6 | 6 | | 2 | 1 |
| | ⟆ | | | | | |
| | 62 | 64 | 63 | | 31 | 31 |
| | 63 | 64 | 64 | | 32 | 32 |
| | 64 | 64 | 64 | | 32 | 32 |

RECORDING DENSITY CORRECTION APPARATUS IN PRINTER

BACKGROUND OF THE INVENTION

The present invention relates to a recording density correction apparatus in a printer for performing thermal transfer recording, thermo-sensitive recording, or the like.

A thermal transfer recording system has been put into practical use as a recording apparatus such as a printer, facsimile equipment or the like, and the system has been widely manufactured. This recording system has only a simple process in which ink is fused or sublimated by heat generated from heating elements constituting a thermal head and the fused ink is made to adhere on recording paper. In this recording system, however, irregularity is cased in size or density of recorded dots to thereby cause unevenness in recording density in the whole of a recorded picture because of variations in heating temperature due to irregularity in resistance value among the heating elements of the thermal head or the like.

In a conventional system, therefore, in order to prevent the unevenness from occurring in recording density, the respective resistance values of the heating elements are detected in advance and stored in a storage circuit so that the energy to be applied to the heating elements in recording is controlled in accordance with the stored resistance values.

Referring to FIG. 5, the configuration of the conventional example will be described. FIG. 5 is a block diagram showing the conventional recording density correction apparatus in a printer as described, for example, in "TECHNIQUE FOR REALIZING HIGH PICTURE QUALITY OF HIGH QUALITY VIDEO COPY", in the Collection of Paper of the Third Non-Impact Printing Technique Symposium, 1986, pp. 37-40.

In FIG. 5, the conventional recording density correction apparatus in a printer is constituted by a counter connected to a clock signal generation circuit (not shown), an EPROM 3 connected to an arithmetic unit 1 such as a personal computer, a minicomputer or the like and the counter 2, and an EPROM 4 connected to the EPROM 3.

Next, referring to FIG. 6, the operation of the foregoing conventional example will be described.

FIG. 6 is an explanatory diagram showing correction gradation level data stored in the EPROM 4 of the conventional recording density correction apparatus in a printer.

First, the arithmetic unit 1 measures the respective resistance values of heating elements constituting a thermal head in advance, divides the heating elements into groups in accordance with the resistance values, determines respective correction factors for the heating elements, and writes class numbers of the correction factors in the EPROM 3 so that the correction factors corresponding to the heating elements may be selected. Alternatively, the arithmetic unit 1 may optically measure unevenness in recording density of a recorded picture so that the heating elements are divided into groups in accordance with values of the thus obtained correction information.

The counter 2 is made to operate in response to a clock signal from the clock generation circuit so that address signals A1 corresponding to the respective heating elements are supplied to the EPROM 3.

The EPROM 3 supplies the EPROM 4 with class numbers (1-16) corresponding to the respective address signals A1, that is, corresponding to the respective heating elements.

The EPROM 4 corrects the input gradation levels D of the drive signals for the thermal head on the basis of the class numbers, that is, the address signals A2. That is, respective correction graduation level data D. shown in FIG. 6 are supplied to the heating elements.

In the foregoing conventional recording density correction apparatus of a printer, however, there has been a problem in that when a recordable density gradation scale is set, for example, to 1/64, the drive signals applied to the heating elements can be corrected only by gradation on 1/64 even if grouping is performed in accordance with a correction factor having correction accuracy of 1/128, and therefore a difference in density between recorded dots adjacent to each other cannot be finely corrected.

SUMMARY OF THE INVENTION

The present invention has been accomplished to solve the foregoing problem in the prior art and an object thereof is to provide a recording density correction apparatus in a printer in which when grouping, a correction factor can be made with a gradation scale of 1/128, unevenness in recording density can be pseudonymously corrected with a gradation scale of 1/128 even in an apparatus in which recording can be performed only with a gradation scale of 1/64, whereby a difference in density between recorded dots adjacent to each other can be finely corrected.

The recording density correction apparatus in a printer according to the present invention is provided with the following means:

(i) a correction gradation level data selection means for producing class numbers for selecting correction gradation level data for respective heating elements constituting a thermal head on the basis of information concerning unevenness in recording density;

(ii) an odd/even line discriminator for discriminating as to whether a recording line is an odd or even line and for providing the thus obtained line information; and (iii) a correction means for providing the correction gradation level data on the basis of the class numbers and the line information so as to correct drive signals for the thermal head.

According to the present invention, by means of the correction gradation level data selection means, class numbers for selecting correction gradation level data for respective heating elements constituting a thermal head are provided on the basis of information concerning unevenness in recording density.

Further, by means of the odd/even line discriminator, discrimination is made as to whether a recording line is an odd or even line and the thus obtained line information is provided.

Then, by means of the correction means, the correction gradation level data are provided on the basis of the class numbers and the line information so that the drive signals for the thermal head are corrected.

BRIEF DESCRIPTION OF THE DRAWINGS

FIG. 2 is an explanatory diagram showing correction gradation level data according to the present invention;

DETAILED DESCRIPTION OF A PREFERRED EMBODIMENT

Figure 1:
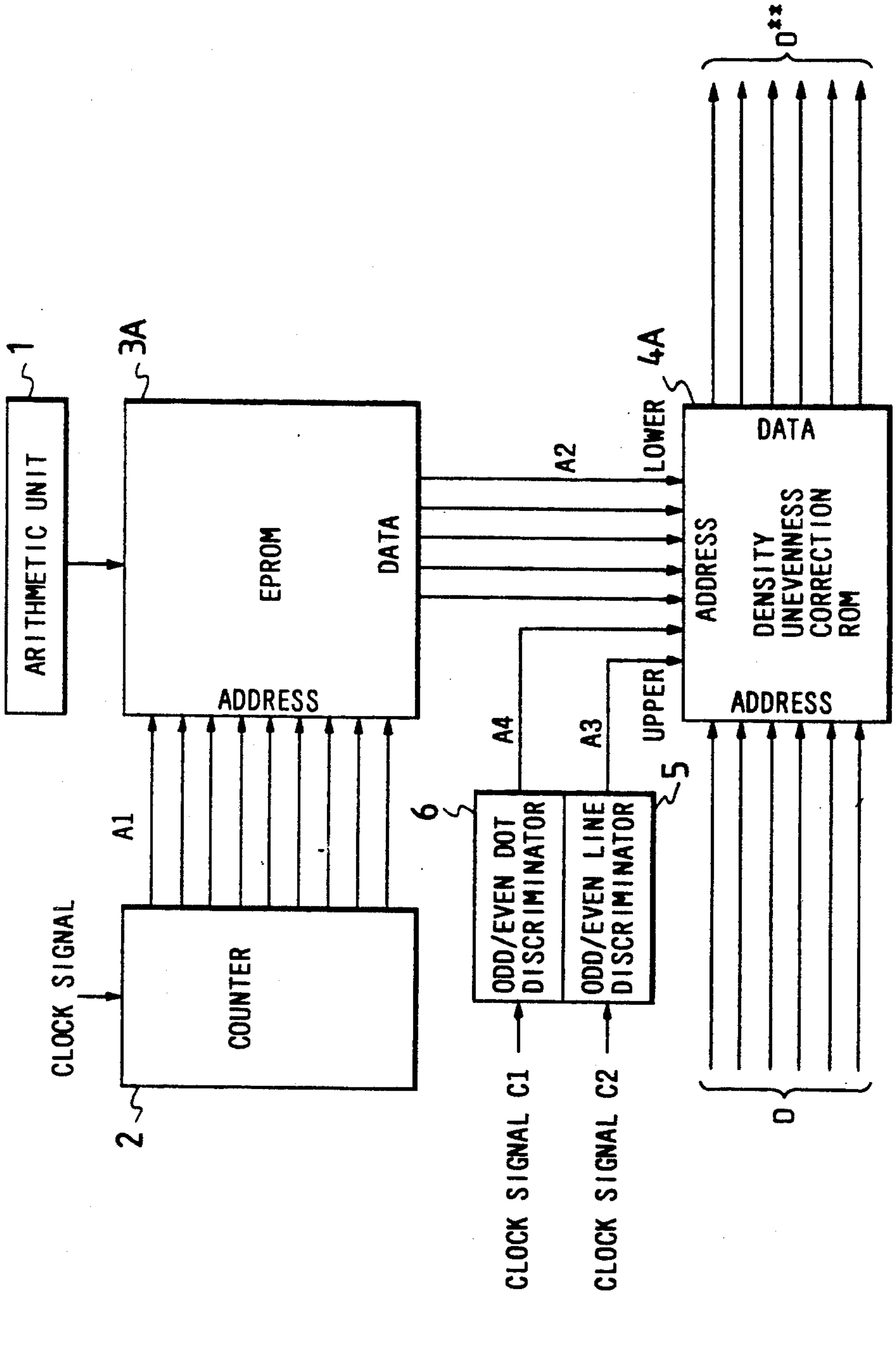
FIG. 1 is a block diagram showing an embodiment of the present invention.

Referring to FIG. 1, the configuration of an embodiment of the present invention will be described.

FIG. 1 is a block diagram showing an embodiment of the present invention, in which a counter 2 is the same as that of the foregoihg conventional apparatus.

In FIG. 1, the embodiment of the present invention is constituted by, in addition to the same components as those of the foregoing conventional apparatus, an EPROM 3A connected to an arithmetic unit 1 and the counter 2, an odd/even line discriminator 5 such as a line counter or the like connected to a first clock signal generator (not shown), an odd/even dot discriminator 6 such as a dot counter or the like connected to a second clock signal generator (not shown), and a density unevenness correction ROM 4A such as an EPROM or the like connected to the EPROM 3A, the odd/even line discriminator 5, and the odd/even dot discriminator 6.

In the foregoing embodiment of the present invention, the correction gradation level data selection means is constituted by the counter 2 and the EPROM 3A, and the correction means is constituted by the density unevenness correction ROM 4A.

Next, referring FIGS. 2 through 4, the operation of the above embodiment will be described.

Figures 3, 4:
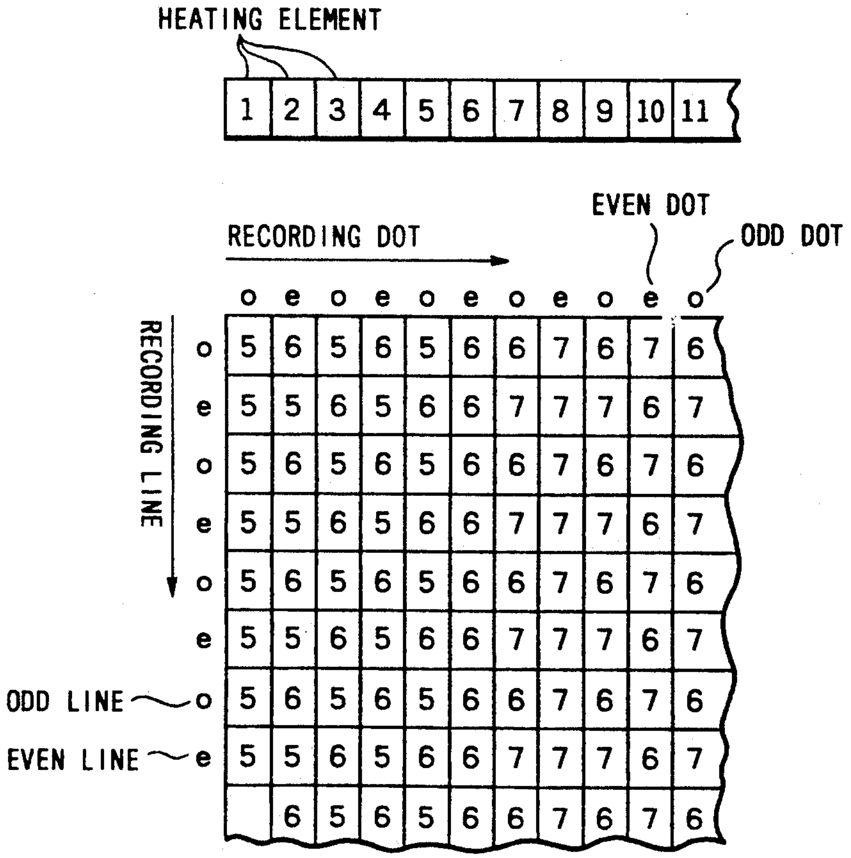
FIG. 3 is an explanatory diagram showing an example of class numbers corresponding to the heating elements according to the present invention.
FIG. 4 is an explanatory diagram partially showing a recorded picture corresponding to the heating elements according to the present invention.
Figures 5, 6:
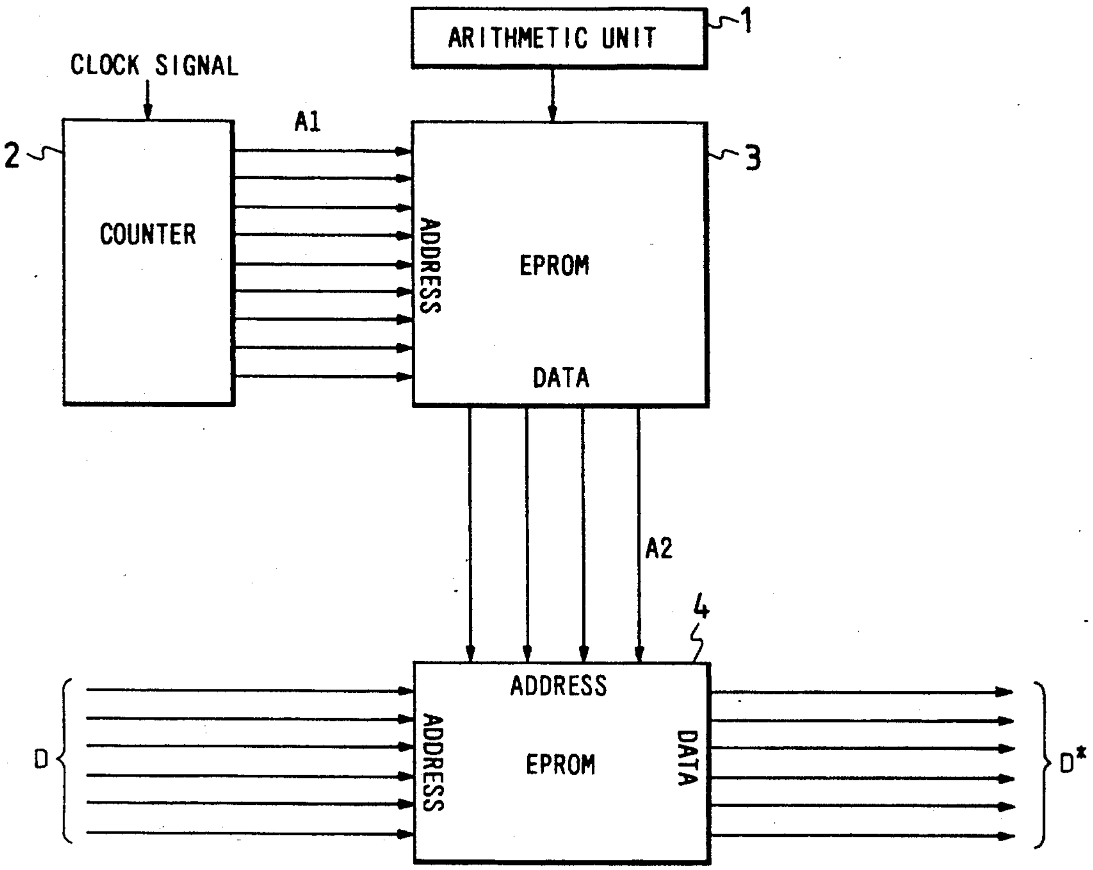
FIG. 5 is a block diagram showing a conventional recording density correction apparatus in a printer.
FIG. 6 is an explanatory diagram showing correction gradation level data of the conventional recording density correction apparatus in a printer.

FIG. 2 is an explanatory diagram showing correction gradation level data stored in the density unevenness correction ROM 4A in this embodiment of the present invention, FIG. 3 is an explanatory diagram showing an example of class numbers corresponding to heating elements in the embodiment of the present invention, and FIG. 4 is an explanatory diagram partially showing a recorded picture corresponding to the heating elements in the embodiment of the present invention.

In FIG. 4, respective numerical values of the recorded picture shown in the lower column represent recording density, that is, correction gradation level data.

The operations of the arithmetic unit 1 and the counter 2 are the same as those of the conventional apparatus.

The EPROM 3A supplies, as address signals A2, class numbers (1-32) corresponding to address signals A1, that is, corresponding to the heating elements, to the density unevenness correction ROM 4A.

At the same time, the odd/even line discriminator 5 supplies the density unevenness correction ROM 4A with line information A3 representing the fact that a recording line is even/odd one on the basis of a clock signal Cl from the first clock signal generator, and, on the other hand, the odd/even dot discriminator 6 supplies the density unevenness correction ROM 4A with dot information A4 representing the fact that the address signal A1 corresponding to the heating element is odd or even one on the basis of a clock signal C2 from the second clock signal generator.

The density unevenness correction ROM 4*a* corrects the input gradation levels D of the drive signals for a thermal head on the basis of the class number, that is, the address signal A2, the line information A3, and the dot information A4. That is, correction gradation level data D** corresponding to an even/odd line and an even/odd dot in one and the same class number are supplied to each of the heating elements constituting the thermal head as shown in FIG. 2.

Here, a specific example will be described. Assume that all the input gradation levels D of the drive signals before correction are "6". FIG. 3 shows the class numbers corresponding to the heating elements (1, 2, 3, . . . 11, . . . ) of the thermal head. The class numbers are stored in the EPROM 3A.

In the case where the first heating element of the first line is to be driven in response to the drive signal before correction, the class number is "18" as shown in FIG. 3, and correction gradation level data "5" in the class number "18" of the odd line and the odd dot corresponding to the input gradation level "6" as shown in FIG. 2 are put out as a corrected drive signal D** by the density unevenness correction ROM 4A.

Similarly to this, in the case of the second line, correction gradation level data of a corrected drive signal to be produced to the first heating element are "5". In the case where the second heating element of the first line is to be driven, the class number is "17" as shown in FIG. 3, and correction gradation level data "6" in the class number "17" of the odd line and the even dot corresponding to the input gradation level "6" as shown in FIG. 2 are put out as a corrected drive signal D** by the density unevenness correction ROM 4A.

Similarly to this, in the case of the second line, correction gradation level data of a corrected drive signal to be supplied to the second heating element are "5".

The density recorded by the first heating element is the fifth gradation on each of odd and even lines, while the density recorded by the second heating element is alternately changed in such a manner that the sixth gradation density is on each odd line and the fifth gradation density is on each even line, as shown in FIG. 4. The second heating element, therefore, can pseudonymously record the 5.5-th gradation density. That is, it is shown that the recording density can be corrected with a density gradation scale of 1/128.

In this embodiment of the present invention, as described above, the recording lines are classified into those in odd number and those in even number, and the gradation level data can be changed over every time each of the lines is recorded so that different gradation level data can be provided for the odd and even recording lines. For example, a corrected drive signal for the thirtieth gradation and a corrected drive signal for the thirty-first gradation are alternately supplied to one heating element in response to the same drive signal before correction by switching the corrected drive signals between the cases of an odd line and an even line respectively. Accordingly, even in an apparatus in which recording can be performed only with a gradation scale of 1/64, unevenness in recording density can be pseudonymously corrected with a density gradation scale of 1/128.

According to the present invention, as described above, the apparatus is provided with a correction gradation level data selection means for producing class numbers for selecting correction gradation level data for respective heating elements constituting a thermal head on the basis of information concerning unevenness in recording density; an odd/even line discriminator for discriminating as to whether a recording line is an odd or even line and for providing the thus obtained line information; and a correction means for providing the selected correction gradation level data on the basis of the class numbers and the line information so as to correct drive signals for the thermal head. Therefore, the apparatus has such an effect that a difference in density between recorded dots adjacent to each other can be finely corrected to thereby make it possible to realize a high quality picture in which unevenness in recording density is hardly caused.

What is claimed is:

1. A recording density correction apparatus in a printer, comprising;

a correction gradation level data selection means for producing class numbers for selecting correction gradation level data for respective heating elements constituting a thermal head according to information concerning unevenness in recording density;

an odd/even line discriminator for discriminating as to whether a recording line is an odd or even line and for providing the thus obtained line information; and a correction means for providing said selected correction gradation level data according to said class numbers and said line information so as to correct drive signals for said thermal head.

2. A recording density correction apparatus as claimed in claim 1, further comprising an odd/even dot discriminator for supplying said correction means with dot information representing whether address signals corresponding to said respective heating elements are odd or even.

3. A recording density correction apparatus as claimed in claim 1, wherein said correction gradation level data selection means comprises a counter and an EPROM, and said correction means comprises a density unevenness correction ROM.

4. A recording density correction apparatus as claimed in claim 2, wherein said odd/even line discriminator is a line counter, and said odd/even dot discriminator is a dot counter.

* * * * *